J. J. HAINES.
VEHICLE WHEEL.
APPLICATION FILED JUNE 9, 1910.
997,668.
Patented July 11, 1911.
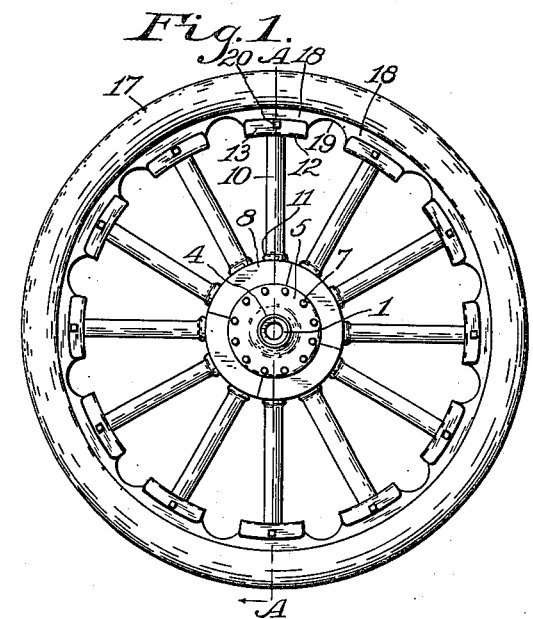
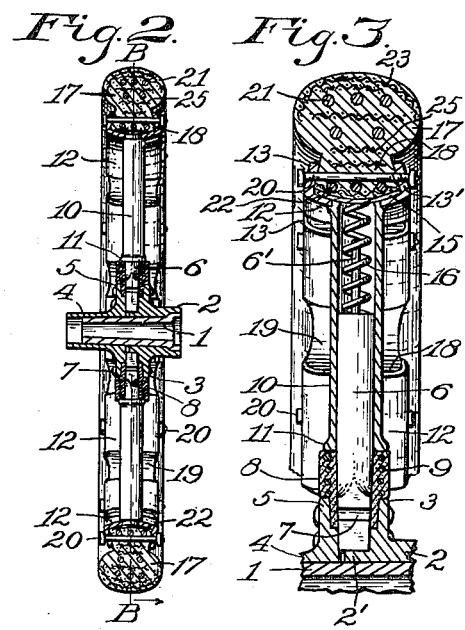
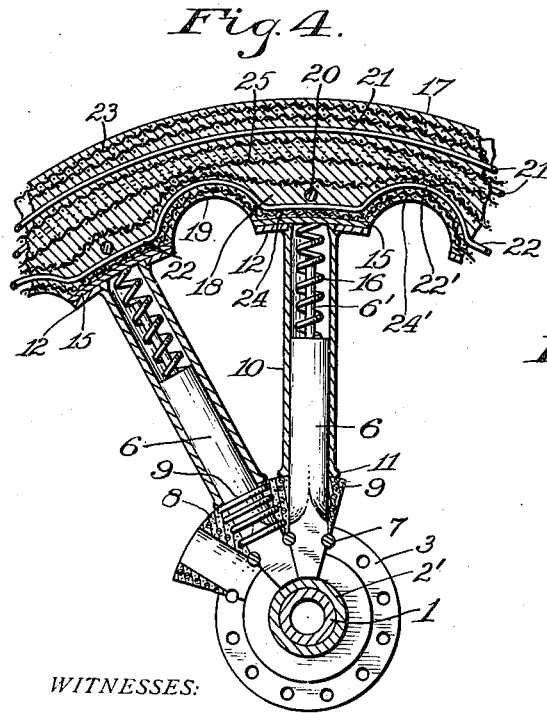
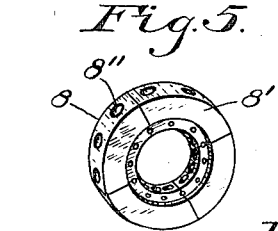
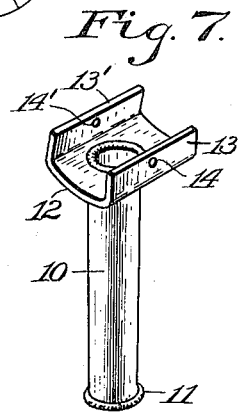
WITNESSES:
J. H. Gardner
K. R. Woddell
INVENTOR:
John J. Haines,
BY
E. T. Silvius,
ATTORNEY.

UNITED STATES PATENT OFFICE.

JOHN J. HAINES, OF INDIANAPOLIS, INDIANA.

VEHICLE-WHEEL.

997,668. Specification of Letters Patent. Patented July 11, 1911.

Application filed June 9, 1910. Serial No. 566,074.

*To all whom it may concern:*

Be it known that I, JOHN J. HAINES, a citizen of the United States, residing at Indianapolis, in the county of Marion and State of Indiana, have invented certain new and useful Improvements in Vehicle-Wheels; and I do declare the following to be a full, clear, and exact description of the invention, reference being had to the accompanying drawings, and to the letters and figures of reference marked thereon, which form a part of this specification.

This invention relates to wheels for automobiles, wagons, carriages, and similar road vehicles, and has reference particularly to wheels having the characteristics of rubber-tired wheels and spring-cushion wheels of the type that are designed to practically serve the purposes of wheels having pneumatic tires, without the disadvantages of inflated tires.

The object of the invention is to provide an improved vehicle-wheel that will be adapted to afford the desired degree of resiliency or shock-absorbing efficiency on rough or uneven roads with the use of substantially solid rubber-tires, or the equivalent thereof, to the end that the expenses incidental to the pneumatic tires may be avoided, a further object being to provide a wheel of the above-mentioned character that will be adapted to be constructed at moderate expense and be reliable and economical in use.

The invention comprises a novel combined felly and tire, a hub, and novel spokes, all constituting a shock absorbing wheel having a resilient periphery or tread, and the invention consists also in certain novel parts, and in combinations and arrangements of parts, as hereinafter particularly described and claimed.

Referring to the drawings, Figure 1 is an elevation of the outer side of the improved wheel; Fig. 2, a sectional view approximately on the line A A in Fig. 1; Fig. 3; a fragmentary section on an enlarged scale also approximately on the line A A; Fig. 4, a fragmentary sectional view approximately on the line B B in Fig. 2; Fig. 5, a perspective view of a spoke cushion with which the hub is provided; Fig. 6, a perspective view of a part of one of the novel spokes; and Fig. 7, a perspective view of another part of the spoke.

Similar reference characters in the drawings indicate like parts or features of construction in the different figures thereof and referred to herein.

The improved wheel comprises a hub which may be variously constructed and which preferably includes a core or main part 1 on the inner end of which is a collar 2 having a flange 3 and preferably an extension 2' beyond the flange to constitute a spoke-seat, the forward portion of the core or main part having a collar 4 thereon provided with a flange 5 arranged opposite the flange 3 with suitable space between the flanges to receive the spokes of the wheel. Each spoke comprises a stub end part 6, one end of which is adapted to be secured to the hub, and the opposite end of which preferably has a guide-rod 6' projecting from its end. The spoke-parts 6 are assembled between the flanges 3 and 5 and secured between them by means of rivets 7 or the like. A cushion extends around the flanges in contact with the peripheries thereof, and it extends also between the spoke-parts 6 and around the portions of the spoke-parts adjacent to the peripheries of the flanges and preferably at the sides of the spokes between them and portions of the flanges, the inner sides of which are suitably shaped to receive extensions of the cushions. Said cushions preferably consist of a suitable number of segments, as 8, 8', having apertures 8'' therein to receive the spoke-parts 6, and in some cases the cushions have coil-springs 9 therein that extend around the spoke-parts so as to reinforce the cushions which are preferably composed of rubber or a suitable composition thereof. Each spoke comprises also a tubular spoke part 10 which is adapted to slide longitudinally over the spoke part 6 and has a flange 11 on one end thereof that is in contact with the cushion on the hub, the opposite end of the spoke part 10 having each a plate 12 suitably secured thereto which has two opposing flanges 13 and 13' provided with bolt-holes 14 and 14', respectively, to constitute a combined bearing and retaining plate of suitable contour corresponding substantially to a relatively small segment or section of wheel-felly.

The outer end of the spoke-part 10 is preferably closed by means of a plate 15 corresponding to the plate 12 and placed thereon, so as to extend across the end of the spoke-part to afford a spring-seat, each spoke having a coil-spring 16 arranged in the part 10 and having one end in contact with the end of the part 6 and the other end in contact with the end closure of the part 10; the spring extending around the rod 6'. Any mechanical expedient may be employed for attaching the plate 12 to the tubular part 10 of the spoke and also for attaching the plate 15 so as to perform the required function, it being common practice to braze metal together. The plate 15 constitutes a reinforcing part of the plate 12 as illustrated.

The combined felly and tire comprises a continuous body portion composed of suitable composition having the characteristics of rubber or rubber composition, and it is relatively large in diameter in cross-section, so as to have a high degree of resiliency, and the inner portion presented toward the hub has a suitable number of lugs 18 thereon that project toward the hub, there being arches 19 formed between the different lugs, the dimensions of the lugs conforming to the plates 12 and the flanges thereon to which they are secured by retaining bolts 20. A suitable number of reinforcing wires or rods 21 are embedded in the body portion 17 and extend circumferentially to prevent the body portion from stretching, and also to prevent the tendency of centrifugal force to throw the body portion off from the spokes in operation at high speed, there being also reinforcing wires or rods 22 embedded in the composition, and they extend in the lugs between the retaining bolts 20 and the combined bearing and retaining plates and also follow the contours of the arches, so that they have arched portions 22'. The tread portion of the body-part 17 has fabric reinforcement 23 therein near the surface, and also there is fabric reinforcement 24 in the lugs and in the arched portions between the lugs, there being preferably other fabric reinforcement 25 extending circumferentially in the body portion 17. The combined felly and tire thus constructed can not become enlarged diametrically to an undesirable extent and is adapted to withstand considerable wear while being capable of use even when considerably tread-worn, so that repairs of tires before completion of trips are avoided.

In practical use the under portion of the tread in contact with the ground is quite yielding, and when the load or the shock in passing over a stone or uneven ground is sufficient to cause movement of the spoke part 10, the latter moves inward toward the hub to absorb severe shocks by reason of the spring therein, while the shock is partially absorbed by the cushion on the hub. If the force of the shock is received between the spokes the combined felly and tire, which is relatively thin at the arches, yields inward to a degree approximately corresponding to the yield of the spokes.

It is to be understood that various modifications may be made in details, depending somewhat upon the nature of the services to be performed by the wheels and load to be carried. Also the combined felly and tire may be composed of various materials, the reinforcements 22, 22' being preferably composed of spring-wire, and other reinforcements of various material may be used.

Having thus described the invention, what is claimed as new, is—

1. In a wheel, a felly having a plurality of elastic lugs thereon, reinforcing wires in the lugs extending circumferentially and also outwardly therein toward the periphery of the felly, a plurality of radially yielding spokes having each a plate thereon seated against the end of a lug, each plate having two flanges engaging opposite sides of the lug, and securing devices engaging the lugs between the wires and the periphery of the felly and connected to the flanges of the plates.

2. In a wheel, a felly having a plurality of elastic lugs thereon, reinforcing wires in the lugs extending circumferentially and also outwardly therein toward the periphery of the felly, a plurality of radially yielding spokes having each a plate thereon seated against the end of a lug, each plate having two flanges engaging opposite sides of the lug, and devices engaging the wires in the lugs and securing the lugs to the plates.

3. In a wheel, a felly having a plurality of projecting elastic lugs thereon, each lug having a transverse hole therein, reinforcing wires in the lugs adjacent the sides of the holes that are toward the axis of rotation of the felly, the wires extending circumferentially and also outwardly in the lugs toward the periphery of the felly, a plurality of radially yielding spokes having each a plate thereon seated on the end of a lug, each plate having two apertured flanges engaging opposite sides of the lug, and bolts extending through the apertured flanges and the transverse holes in contact with said wires.

4. In a wheel, a hub having a cushion thereon, stub spoke parts attached to the hub and extending through the cushion, tubular spoke parts movable on the stub spoke parts and having flanges thereon seated on the cushion, springs seated in the tubular spoke parts and also against the stub spoke parts, a resilient combined felly and tire having lugs thereon, and devices connecting the lugs to the tubular spoke parts.

5. In a wheel, a hub having a cushion thereon comprising elastic composition extending about the hub and having apertures therein and coil springs extending about the apertures, stub spoke parts attached to the hub and extending through said apertures, tubular spoke parts movable on the stub spoke parts and having flanges thereon seated on the cushion, a resilient combined felly and tire having lugs thereon, and devices connecting the lugs to the tubular spoke parts.

6. In a wheel, the combination of a hub, stub spoke parts secured to the hub, tubular spoke parts movable on the stub spoke parts, combined bearing and retaining plates secured to the tubular spoke parts and having flanges thereon, springs between said plates and stub spoke parts, an elastic combined felly and tire having lugs thereon seated on the said plates between the flanges thereof, securing bolts extending through the lugs and said flanges, and wires in said felly and tire extending into said lugs between said plates and said bolts.

7. In a wheel, the combination of a hub, stub spoke parts secured to the hub and having guide-rods on the ends thereof, tubular spoke parts movable on the stub spoke parts and having each a combined bearing and retaining plate thereon provided each with flanges, each plate comprising a closure plate extending across the end of the tubular spoke part, springs extending about the guide-rods and seated against the stub spoke parts and said closure plates within the tubular spoke parts, an elastic combined felly and tire having lugs thereon seated on the said closure plates, and bolts securing the lugs to the flanges.

8. A wheel including a hub having a cushion thereon, stub spoke parts attached to the hub and extending through the cushion, tubular spoke parts movable on the stub spoke parts and seated on the cushion and having each a combined bearing and retaining plate thereon provided each with flanges, springs seated in the tubular spoke parts and also against the stub spoke parts, a resilient combined felly and tire having lugs thereon seated on the combined bearing and retaining plates between the flanges thereof, and bolts securing the lugs to the flanges.

In testimony whereof, I affix my signature in presence of two witnesses.

JOHN J. HAINES.

Witnesses:
  E. T. SILVIUS,
  K. R. WODDELL.